(No Model.)
J. T. OYLER.
BICYCLE WHEEL.
No. 498,688. Patented May 30, 1893.
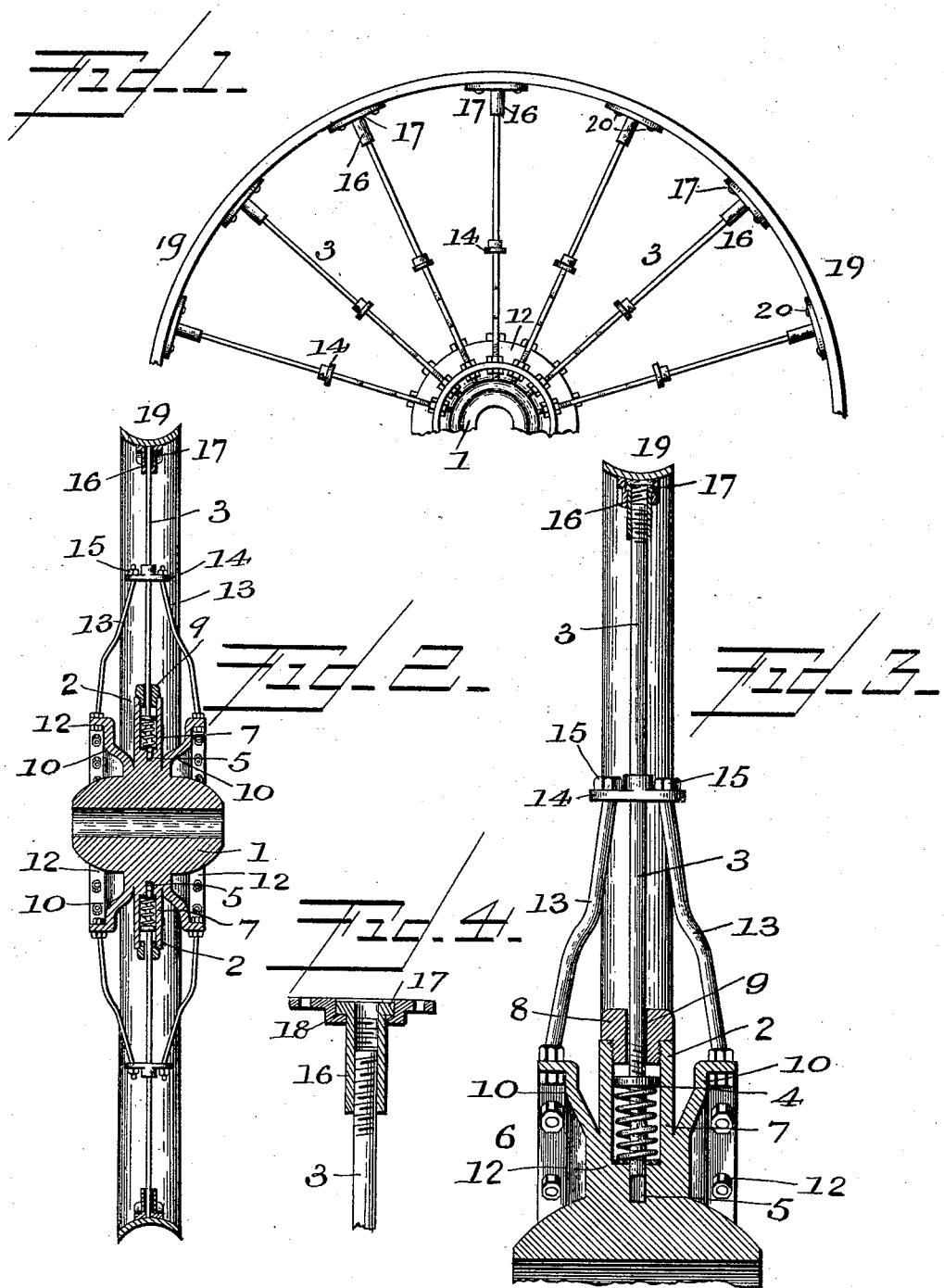
WITNESSES
F. L. Durand
H. L. Coombs
INVENTOR
John T. Oyler
by Louis Bagger & Co
Attorneys

United States Patent Office.

JOHN T. OYLER, OF TRAVERSE CITY, MICHIGAN.

BICYCLE-WHEEL.

SPECIFICATION forming part of Letters Patent No. 498,688, dated May 30, 1893.

Application filed December 13, 1892. Serial No. 454,999. (No model.)

*To all whom it may concern:*

Be it known that I, JOHN T. OYLER, a citizen of the United States, and a resident of Traverse City, in the county of Grand Traverse and State of Michigan, have invented certain new and useful Improvements in Bicycle-Wheels; and I do hereby declare that the following is a full, clear, and exact description of the invention, which will enable others skilled in the art to which it appertains to make and use the same, reference being had to the accompanying drawings, which form a part of this specification.

My invention relates to improvements in bicycle and other wheels, and its object is to provide a novel construction of same, in which the spokes are yieldingly connected with the hub, so as to give when the wheel meets with an obstruction or when traveling over rough ground, thus not only rendering riding easier and more comfortable, but also lessening the liability of the spokes breaking, which frequently occurs when the spokes are rigidly connected with the hub.

The invention consists in the novel construction and combination of parts, hereinafter fully described and claimed.

In the accompanying drawings: Figure 1 is a side elevation of a wheel constructed in accordance with my invention. Fig. 2 is a section on the line x—x, Fig. 1. Fig. 3 is a detail sectional elevation on an enlarged scale, of a portion of the hub and one of the spokes. Fig. 4 is a detail sectional view.

In the said drawings, the reference numeral 1 designates the hub of the wheel, being formed or provided with a series of radial sockets 2, corresponding in number with the spokes. The sockets at their outer ends, are screw-threaded interiorly to receive a burr or nut, hereinafter described.

The numeral 3 denotes the spokes, made of metal, and are somewhat heavier than the ordinary bicycle spokes. The inner ends of these spokes are reduced in diameter, and provided with collars 4, which are screw-threaded to engage with corresponding threads on the spokes, whereby they are held in place. The inner ends of these spokes enter openings 5 in the hub, shoulders 6, being formed between the inner ends of the sockets and the hub, against which abut coiled springs 7, the opposite ends of which bear against the collars 4. Fitting in the screw-threaded ends of the sockets are burrs or nuts 8, having angular heads 9, to receive a wrench or other instrument by which they are rotated. The spokes pass loosely through these burrs or nuts.

The numerals 10, 10, designate two disks formed integral with or secured to the hub at each side thereof, and provided with outwardly projecting flanges 12 at their peripheries. These flanges are formed with aligned holes equidistant apart, to receive the ends of rods 13, the other ends of which pass through apertures in plates 14, through which the spokes pass. The ends of these rods are screw-threaded to receive nuts 15, by which they are secured in place. The outer ends of the spokes are screw-threaded, and fit in correspondingly threaded nipples 16. The outer ends of these nipples are formed with annular flanges 17, which seat in recesses in sockets 18, which are secured in the inner side of the tire 19, by means of screws 20.

From the above it will be seen that when the wheel strikes a stone or other like obstruction, the spokes at that point, will give and thus lessen the jar, and the liability of damaging the wheel, and the spring will restore the spoke to normal position when the obstruction is passed. By means of the screw connection with the tire, a spoke can be removed and replaced, without removing the rubber tire or cushion.

Having thus described my invention, what I claim is—

1. A bicycle or other wheel, consisting of the hub having a series of radial sockets, the spokes fitting in said sockets, the collars on the spokes, the coiled springs located in said sockets, and embracing the inner ends of the spokes, and the tire with which the outer ends of the spokes are connected, substantially as described.

2. In a bicycle or other wheel, the combination with the hub formed or provided with disks, and radial sockets intermediate thereof, having interiorly screw-threaded ends, of the spokes the inner ends of which are provided with collars, the coiled springs, the burrs or nuts through which the spokes pass, the plates on the spokes, and the rods connected therewith, and with the disks, substantially as described.

In testimony that I claim the foregoing as my own I have hereunto affixed my signature in presence of two witnesses.

JOHN T. OYLER.

Witnesses:
ELMER J. HIATT,
NELLIE M. WELBASKY.